US012784518B2

(12) United States Patent
Zhang

(10) Patent No.: US 12,784,518 B2
(45) Date of Patent: Nov. 3, 2026

(54) METHOD AND SYSTEM FOR DIAGNOSING VEHICLE FAULTS USING DIGITAL TWIN

(71) Applicant: CAROTA Technology Corporation, Shanghai (CN)

(72) Inventor: Xinjie Zhang, Shanghai (CN)

(73) Assignee: CAROTA Technology Corporation, Shanghai (CN)

( * ) Notice: Subject to any disclaimer, the term of this patent is extended or adjusted under 35 U.S.C. 154(b) by 50 days.

(21) Appl. No.: 18/960,486

(22) Filed: Nov. 26, 2024

(65) Prior Publication Data

US 2025/0087035 A1 Mar. 13, 2025

(30) Foreign Application Priority Data

Nov. 14, 2024 (CN) ........................ 202411629818.X

(51) Int. Cl.
*G07C 5/08* (2006.01)

(52) U.S. Cl.
CPC ......... *G07C 5/0825* (2013.01); *G07C 5/0808* (2013.01); *G07C 5/085* (2013.01)

(58) Field of Classification Search
CPC ............ G05B 23/0262; G05B 23/0243; G05B 23/0275; G05B 2219/24065; G07C 5/0808; G07C 5/0825; G07C 5/085; Y02T 10/40
See application file for complete search history.

(56) References Cited

U.S. PATENT DOCUMENTS

2003/0097218 A1* 5/2003 Borugian ............... B62D 53/12 701/1
2018/0257683 A1* 9/2018 Govindappa ........... B61L 27/57
2019/0266295 A1* 8/2019 Masuda ................. G06Q 50/40
2019/0287079 A1* 9/2019 Shiraishi .............. G07C 5/0841
2021/0096975 A1 4/2021 Deluca et al.
2022/0406103 A1* 12/2022 Sakata ................. G07C 5/0808
2024/0127639 A1 4/2024 Cella
2024/0144103 A1 5/2024 Cella et al.

FOREIGN PATENT DOCUMENTS

CN 115091960 A 9/2022
CN 117574488 A 2/2024

OTHER PUBLICATIONS

KR 102917255 B1 with English translation; date filed Dec. 14, 2023; date published Jan. 27, 2026. (Year: 2026).*
CN 114279718 A with English translation; date filed Nov. 30, 2021; date published Apr. 5, 2022. (Year: 2022).*
KR 20230158787 A with English translation; date filed May 12, 2022; date published Nov. 21, 2023. (Year: 2023).*

* cited by examiner

*Primary Examiner* — Calvin Cheung

(57) ABSTRACT

The disclosure provides a method and system for diagnosing vehicle faults and system using digital twin. The method can comprise: (S1) collecting a vehicle data of a vehicle; (S2) storing the collected vehicle data in association with respective generation time stamp and sensor identification codes; (S3) performing a preliminary diagnosis of whether the vehicle has a fault based on the collected vehicle sensor data; (S4) performing a digital twin diagnosis of the vehicle fault if the preliminary diagnosis result indicates that the vehicle has a fault; and (S5) generating a visual representation of the fault. In comparison to conventional diagnostic techniques, the real-time digital twin model-based method for diagnosing vehicle faults of the disclosure offers enhanced efficiency, precision, and comprehensive fault detection.

5 Claims, 2 Drawing Sheets

METHOD AND SYSTEM FOR DIAGNOSING VEHICLE FAULTS USING DIGITAL TWIN

CROSS-REFERENCE TO RELATED APPLICATIONS

This application claims priority to Chinese patent application No. 202411629818. X, filed on Nov. 14, 2024, the contents of which are incorporated herein by reference.

TECHNICAL FIELD

The disclosure relates generally to automated fault diagnosis for vehicles, particularly to methods and systems for diagnosing vehicle faults using digital twins.

BACKGROUND

Digital twin, also referred to as digital mapping, is a technology that enables real-time monitoring and analysis through the creation of virtual replicas of physical entities that mirror their state and behavior. In the domain of vehicle fault troubleshooting, digital twin technology enables engineers and technicians to identify and anticipate faults without direct contact with the vehicle by creating a virtual replica of the vehicle. The digital twin technology employs sensor data, operating history, and real-time performance information to construct a dynamic vehicle model that can simulate real-world conditions in a virtual environment, thereby enabling the prediction and diagnosis of potential faults. The application of digital twin technology in the diagnosis of vehicle faults not only enhances the precision and efficacy of this process, but also facilitates the sustained operation and performance enhancement of the vehicle.

The existing digital twin-based technologies for vehicle diagnostics rely significantly on data gathered by in-vehicle sensors, including engine temperature, oil pressure, battery status, and other pivotal metrics. While this information is indispensable for comprehending the internal workings of the vehicle, it does not fully reveal how the vehicle behaves in the real world. To obtain more comprehensive data, a combination of information about the driver's operation and information about the vehicle's exterior, such as weather conditions, road type, and traffic conditions, which are all important factors affecting the vehicle's performance, is required. Another challenge inherent to digital twin models is the process of iteration and updating of the model. As vehicle data is collected on an ongoing basis, the model must be updated on a regular basis to reflect the most recent information. This process requires the utilization of robust computational capabilities to quickly process large amounts of data and implement complex algorithms and simulations within the model. This consequently increases the demand on hardware resources, and furthermore, it implies that the simulation process may require a considerable length of time before the model attains an adequate level of accuracy.

SUMMARY

A first aspect of the disclosure provides method for diagnosing vehicle faults using a digital twin. In some embodiments, the method can comprise (S1) collecting a vehicle data of a vehicle, the vehicle data comprising a vehicle sensor data, a user operating behavior data and a vehicle environment data, the vehicle having an initial vehicle digital twin model M1; (S2) storing the collected vehicle data in association with respective generation time stamp and sensor identification codes in a first database DB1 and a second database DB2; (S3) performing a preliminary diagnosis of whether the vehicle has a fault based on the collected vehicle sensor data to obtain a preliminary diagnosis result; (S4) performing a digital twin diagnosis of a vehicle fault if the preliminary diagnosis result indicates that the vehicle has a fault; and (S5) generating a visual representation of the fault. In some embodiments, the processing (S4) can further comprise (S41) determining a real-time vehicle digital twin model M2, the real-time vehicle digital twin model M2 corresponding to an occurrence time T of the fault and indicating an actual state of the vehicle; and (S42) determining a location and a fault level of a faulty component based on the initial vehicle digital twin model M1, the occurrence time T of the fault and the real-time vehicle digital twin model M2.

In some embodiments, the processing (S2) can comprise storing the collected vehicle data in the first database DB1 using the generation time stamp as a primary key and the sensor identification code as a secondary key; and storing the collected vehicle data in the second database DB2 using the sensor identification code as a primary key and the generation time stamp as a secondary key.

In some embodiments, the processing (S41) can comprise (S411) retrieving from the first database DB1 the vehicle data that is collected over a predetermined time period preceding the occurrence time T; (S412) entering, in a time stamp sequence, the collected vehicle data retrieved in (S411) as input data into the initial vehicle digital twin model M1 for simulation, thereby generating a sensor simulation data; and (S413) comparing the sensor simulation data with the collected vehicle data to iteratively optimizing the initial vehicle digital twin model M1 so as to obtain the real-time vehicle digital twin model M2. A difference between model parameter values of the real-time vehicle digital twin model M2 and the initial vehicle digital twin model M1 can be indicative of the location and fault level of the faulty component.

In some embodiments, the processing (S412) can comprise (S4121) defining a state transfer equation of formula (I) to generate a current sensor estimate from a prior vehicle data:

$$x(t|t-1) = f(y(t-1),\ u(t-1),\ s(t-1)) \tag{I}$$

where x(t|t−1) is the sensor estimate at time t generated from the vehicle data at time t−1, y(t−1) is the vehicle sensor data at time t−1, u(t−1) is the user operating behavior data at time t−1, s(t−1) is the vehicle environment data at time t−1, and f(•) is an association characteristic equation; and (S4122) defining an update equation of formula (II):

$$x(t) = x(t|t-1) + x'(t-1) * Ts \tag{II}$$

where x(t) is the sensor simulation data at time t, x(t|t−1) is the sensor estimate at time t generated from the vehicle data at time t−1, x'(t−1) is a derivative of the sensor simulation data at time t−1, and Ts is the time step. Ts can be smaller than an interval during which vehicle data is collected.

In some embodiments, the processing (S413) can comprise (S4131) defining an objective function for iterative optimization of formula (III):

$$\min\{|y(t)-x(t)|\} \quad \text{(III)}$$

where y(t) is the vehicle data collected at time t; and (S4132) determining, using the objective function for iterative optimization, the real-time vehicle digital twin model M2.

In some embodiments, the processing (S42) can comprise determining a general fault in one or more components if a difference in absolute model parameter values of the one or more components in the initial vehicle digital twin model M1 and the real-time vehicle digital twin model M2 exceeds a first empirical threshold; determining a moderate fault in one or more components if a difference in absolute values of parameters of the one or more components in the initial vehicle digital twin model M1 and the real-time vehicle digital twin model M2 exceeds a second empirical threshold; and determining a severe fault in one or more components if a difference in absolute values of parameters of the one or more components in the initial vehicle digital twin model M1 and the real-time vehicle digital twin model M2 exceeds a third empirical threshold. The third empirical threshold can be greater than the second empirical threshold. The second empirical threshold can be greater than the first empirical threshold.

In some embodiments, the processing (S5) can comprise retrieving from the second database DB2 the vehicle data at the occurrence time T of the fault, displaying the real-time vehicle digital twin model M2, and highlighting a model component in the real-time vehicle digital twin model M2 that corresponds to the faulty component.

In some embodiments, the processing (S5) can further comprise displaying detailed model information of a component when a terminal user clicks or touches the component in the real-time vehicle digital twin model M2.

Another aspect of the disclosure provides a system for diagnosing vehicle faults using a digital twin. In some embodiments, the system can comprise an initial vehicle digital twin model M1; a vehicle data collection unit configured to collect a vehicle data of a vehicle, the vehicle data comprising a vehicle sensor data, a user operating behavior data and a vehicle environment data; a first database DB1 and a second database DB2 each configured to store the collected vehicle data in association with respective generation time stamp and sensor identification codes; a vehicle fault preliminary diagnosis unit configured to perform a preliminary diagnosis of whether the vehicle has a fault based on the collected vehicle sensor data to obtain a preliminary diagnosis result; a vehicle fault digital twin diagnosis unit configured to perform a digital twin diagnosis of a vehicle fault if the preliminary diagnosis result indicates that the vehicle has a fault; and a visual presentation unit configured to generate a visual representation of the fault. In some embodiments, the digital twin diagnosis of the vehicle fault can comprise determining a real-time vehicle digital twin model M2, the real-time vehicle digital twin model M2 corresponding to an occurrence time T of the fault and indicating an actual state of the vehicle; and determining a location and a fault level of a faulty component based on the initial vehicle digital twin model M1, the occurrence time T of the fault and the real-time vehicle digital twin model M2

In some embodiments, determining the real-time vehicle digital twin model M2 can comprise (S411) retrieving from the first database DB1 the vehicle data that is collected over a predetermined time period preceding the occurrence time T; (S412) entering, in a time stamp sequence, the collected vehicle data retrieved in (S411) as input data into the initial vehicle digital twin model M1 for simulation, thereby generating a sensor simulation data; and (S413) comparing the sensor simulation data with the collected vehicle data to iteratively optimizing the initial vehicle digital twin model M1 so as to obtain the real-time vehicle digital twin model M2. A difference between model parameter values of the real-time vehicle digital twin model M2 and the initial vehicle digital twin model M1 can be indicative of the location and fault level of the faulty component.

A further aspect of the disclosure provides a system comprising one or more computer processors and a computer-readable memory. The computer readable memory can comprise machine executable code that, upon execution by the one or more computer processors, implements a method for diagnosing vehicle faults using a digital twin of the first aspect of the disclosure.

It should be understood that the disclosure does not intend to identify the key or important features of the embodiments of the disclosure, nor is it intended to limit the scope of the disclosure. Other features of the disclosure will become easily understood through the following description.

BRIEF DESCRIPTION OF THE DRAWINGS

The novel features of the disclosure are set forth with particularity in the appended claims. A better understanding of the features and advantages of the disclosure will be obtained by reference to the following detailed description that sets forth illustrative embodiments, in which the principles of the disclosure are utilized, and the accompanying drawings.

DETAILED DESCRIPTION

The existing digital twin-based vehicle fault diagnosis techniques significantly rely on in-vehicle sensor data, which restricts the technicians from comprehensively understanding the actual status of the vehicle. The actual driving environment encompasses a multitude of variables, including fluctuating weather patterns, complex traffic conditions, and the driver's operating habits. These factors are inherently challenging to ascertain from in-vehicle sensor data alone. Consequently, in order for the digital twin model to more accurately reflect the actual status of the vehicle, it is necessary to consider environmental data and driving behavior data in addition to the aforementioned factors. For instance, data regarding road conditions and traffic flow can be collected through on-board cameras and external sensors, while the Vehicle-to-Everything technology can furnish information on the driving behavior of surrounding vehicles. The incorporation of these external data sets will greatly enhance the predictive capacity and accuracy of the digital twin model. A further challenge associated with the digital twin model is its considerable demand for computational resources. In order to achieve highly accurate simulations, it is necessary to continuously update and iterate the model in order to reflect the latest data collected. This process necessitates the utilization of robust computational resources, particularly when confronted with large amounts of data and complex operations.

In view of the aforementioned problems in the existing methodology, the disclosure provides a novel digital twin-based approach for diagnosing vehicle faults. This approach integrates sensor data from the vehicle as well as data from the surrounding driving environment. This approach also optimizes the method of updating the digital twin model. This, in turn, enables the digital twin model to operate with greater efficacy while reducing the time required for simulation.

Figure 1:
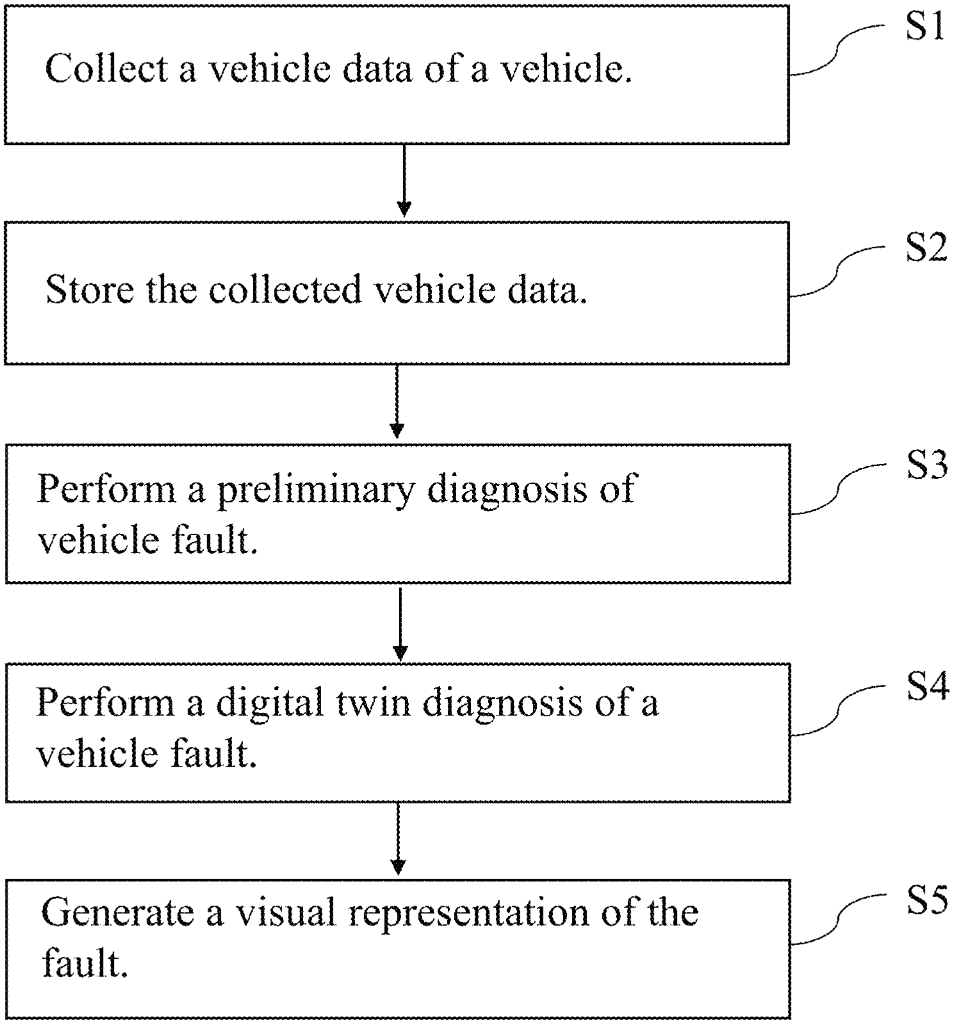
FIG. 1 shows an example of a vehicle digital twin model of the disclosure.

FIG. 1 shows an example of a vehicle digital twin model of the disclosure. The initial digital twin model can be a comprehensive digital representation of the vehicle, constructed based on its design parameters and standard configuration following the completion of the manufacturing process. The initial digital twin model can comprise all essential information about the vehicle, including data regarding engine performance, body structure, electronic systems, and other relevant characteristics. Additionally, it can encompass the optimal conditions of these components at the manufacturing stage. The initial digital twin model can serve as a reference point for the entire life cycle of the vehicle. The real-time status of the vehicle, monitored during its use, can be compared with the initial digital twin model. Such a comparison can enable the timely detection of deviations and potential faults, thereby facilitating the implementation of preventive repair and troubleshooting measures. For example, if the vehicle's real-time data indicates that the engine temperature s consistently higher than the standard temperature as defined in the initial model, then the system can issue an alert to the driver or repair personnel, prompting them to conduct the necessary inspections and repair.

As the vehicle undergoes wear and tear over time, its digital twin model can be updated accordingly to reflect the current state of the vehicle. This implies that the digital twin model can be a dynamic model. The initial digital twin model can be synchronized with the actual vehicle data through a series of automated processes. In an example, the vehicle's performance data, including but not limited to engine temperature, fuel consumption, speed, and the status of the braking system, can be continuously collected by sensors onboard the vehicle. Subsequently, the data can then be transmitted to the cloud server in real time via a vehicle communication system. In the cloud, the data processing system can analyze the collected vehicle information and identify any discrepancies between the actual vehicle data and the initial digital twin model. For example, the system can identify normal wear and tear, potential fault signals, and even the effect of changes in the external environment on the vehicle's performance. Upon the detection of anomalies or deviations in the data, an alert can be triggered, prompting the relevant information to the vehicle driver or repair team. The repair team can analyze the data provided by the model to determine the precise location and underlying cause of the fault, thereby minimizing downtime and increasing the efficiency of the repair process. This rapid response capability can be of particular importance in the context of commercial fleet management as it has the potential to significantly reduce operational disruptions resulting from vehicle faults.

The digital twin model can be automatically updated throughout the entire life cycle of the vehicle. The digital twin model can be adjusted based on real-time data to reflect the current state of the vehicle. This can include wear and tear of parts, minor changes in performance, or even updates to the vehicle configuration. This dynamic updating process can ensure that the digital twin model consistently reflect the most recent condition of the vehicle.

In an embodiment, the digital twin model of the vehicle of the disclosure can include a number of models, including those of the body structure, the powertrain, the braking system, the suspension system, the steering system, and the auxiliary system. For example, the digital twin model of the body structure can encompass not only parameters of the frame and body, but also their simulation response under different load and impact conditions. The digital twin model of the powertrain can be able to simulate the performance of the engine and drivetrain under a variety of operating conditions, including acceleration, fuel efficiency, and emission levels. The digital twin model of the braking system can be used to assess the efficacy of the brake pedal and handbrake, in addition to the response time and distance in emergency situations. The digital twin model for the suspension system can simulate the vehicle's handling under various road conditions, while evaluating the durability of shock absorbers, wheels, and tires. The digital twin of the steering system can be used to assess the responsiveness and accuracy of the steering wheel, as well as the reliability of the entire system following an extended period of use. The digital twin model of auxiliary systems, such as the air conditioning system and the human-machine interaction system, can be used to evaluate the efficiency and user-friendliness of these systems. The initial digital twin model of the vehicle can be a digital twin model of the vehicle in its standard state, devoid of any faults.

Figure 2:
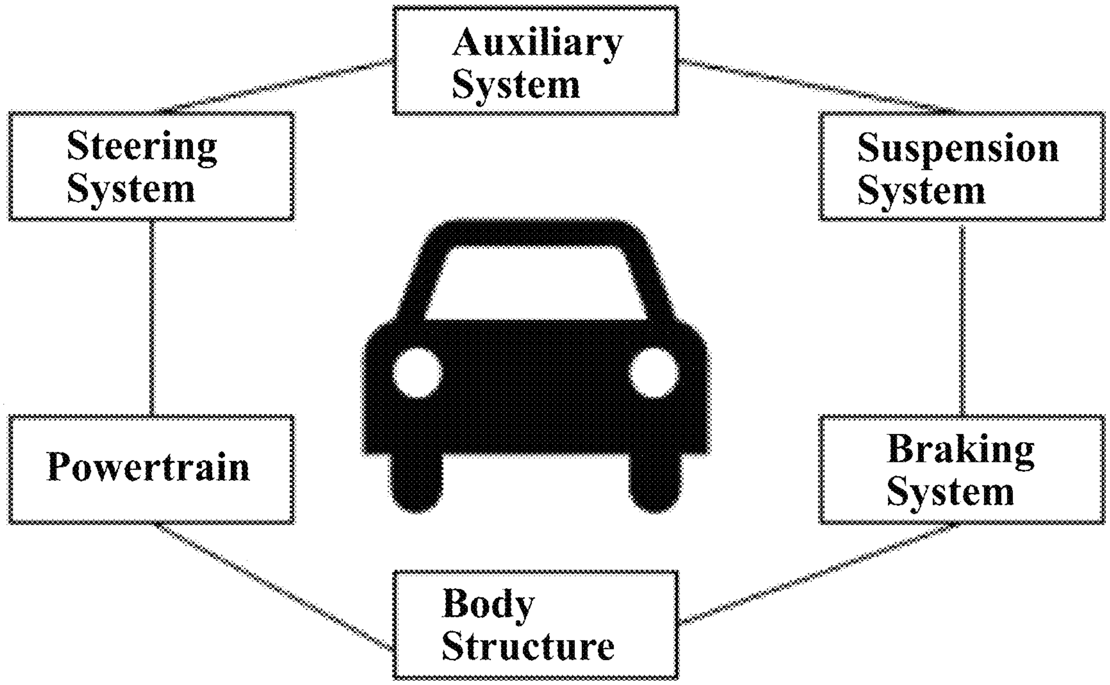
FIG. 2 is a schematic flow chart of a digital twin-based vehicle fault diagnosis method according to embodiments of the disclosure.

FIG. 2 is a schematic flow chart of a digital twin-based vehicle fault diagnosis method according to embodiments of the disclosure. The vehicle can be equipped with an initial digital twin model M1. In an embodiment, the method for diagnosing vehicle faults using the digital twin of the disclosure can comprise: (S1) collecting a vehicle data of a vehicle, (S2) associating the collected vehicle data with the corresponding generation time stamp and sensor identification codes, and storing the associated vehicle data in a first database DB1 as well as a second database DB2, (S3) performing, based on the collected vehicle sensor data, a preliminary diagnosis of whether the vehicle has a fault to obtain a preliminary diagnosis result; (S4) if the preliminary diagnosis result indicates that the vehicle has a fault, performing a digital twin diagnosis of the fault of the vehicle; and (S5) generating a visual representation of the fault.

In some embodiments, the vehicle data collected in the processing (S1) can comprise a vehicle sensor data, a user operating behavior data, and a vehicle environment data. The vehicle sensor data can provide a real-time status of the vehicle, including but not limited to information regarding engine temperature, oil pressure, battery status, and tire pressure. These data points can serve as the foundation for understanding the current operational status of the vehicle. The user operating behavior data can provide further insight into the driver's interaction with the vehicle. For example, a driver's acceleration and braking habits, a steering pattern, and a frequency of use of the vehicle control system can affect the performance and health of the vehicle. By analyzing the user operating behavior data, it is possible to gain a deeper understanding of the contextual situation in which a failure occurs. The vehicle environment data can comprise information pertaining to the external conditions under which the vehicle operates. Such conditions can include, but not limited to, road conditions, weather conditions, traffic flow, and surrounding obstacles. It is therefore important to consider these external data in the fault diagnosis, as they can have an effect on the performance of the vehicle. By means of a comprehensive analysis of data derived from vehicle sensors, user operating behavior, and the external environment, the disclosure provides a digital twin-based method for diagnosing vehicle faults, which is capable of constructing a comprehensive vehicle health profile.

In some embodiments, the vehicle sensor data can comprise variety of metrics, including a vehicle speed, acceleration, an interior temperature, an air flow, a battery voltage, a battery level, a coolant temperature, a degree of car body inclination, and other relevant variables. These data points can be collected from various sensors onboard the vehicle, such as a vehicle speed sensor, an acceleration sensor, an interior temperature sensor, an air flow sensor, a battery voltage sensor, a battery level sensor, a coolant temperature sensor, a vehicle inclination sensor, and others). The user operating behavior data can comprise information regarding an angle of steering wheel, a displacement in brake pedal, a displacement in accelerator pedal, a status of air conditioner (e.g., whether it is on or off, a temperature adjustment amplitude), an operation on seat adjustment, and other relevant variables. The vehicle environment data can comprise information regarding a distance between the vehicle and the vehicle in front, a distance between the vehicle and the vehicle behind, signal light data, lane information, road congestion, weather conditions, traffic flow, and the like.

In the processing (S2), the collected vehicle data can be stored in the first database DB1 as well as the second database DB2. In the context of digital twin technology, an organization and management of data can be of significant importance. In order to achieve an effective data processing, it is essential to develop a data format that aligns with the specific data processing algorithms employed. This approach not only enhances the efficacy of data processing but also guarantees the compatibility of the data format with the processing tasks. In the context of digital twin simulation, the vehicle data collected over a specified period of time can be used as input. The data can be stored in disparate databases, based on varying combinations of generation time stamps and sensor identification codes. For example, the first database DB1 can be used to store the vehicle data with the time stamp of the generated data as the primary key and the sensor identification codes as the secondary key. The aforementioned data structure design can facilitate the expedient retrieval of vehicle data at a specified point in time, thus enabling the simulation of the vehicle's operation during that particular time period. This approach can facilitate the analysis of the vehicle's performance and behavioral patterns, as well as the prediction of future operational trends. In contrast, the second database DB2 can be used to store the vehicle data with the sensor identification code as the primary key and the generation time stamp as the secondary key. This data structure can enable the second database DB2 to efficiently address the fault analysis and localization tasks, as it allows for a rapid retrieval of data based on the sensor identification codes, facilitating the analysis of the operating conditions of the components monitored by a specific sensor at different points in time.

The aforementioned data organization method of the disclosure can also assist in the restoration of the spatial distribution characteristics of faults, which is beneficial for comprehending the environmental and contextual factors that contribute to the occurrence of faults, as well as for the optimization of repair strategies and preventive measures. In practice, a digital twin simulation can be performed by extracting data from the first database DB1 in order to simulate and analyze the operating conditions of the vehicle over a specified period of time. Furthermore, when undertaking a fault analysis and localization, data can be extracted from the second database DB2, with a particular focus on the operation of the target components monitored by the sensors.

In the processing (S3), based on the collected vehicle sensor data, a preliminary diagnosis can be performed to determine whether there is a fault in the vehicle. In an example, the preliminary diagnosis of the disclosure can comprise a comparison of the vehicle sensor data at a designated time point T with a corresponding preset threshold or threshold range. The thresholds or threshold ranges can be predetermined based on a model of data representative of normal operating conditions of the vehicle. Any data exceeding these thresholds or threshold ranges can be indicative of a potential fault of the vehicle. The preliminary diagnosis process can be more than a straightforward comparison of data. Furthermore, it can comprise monitoring a rate of change in data, as well as analyzing the user's operating behavior. For example, the abrupt loss of data from a sensor or a sudden change in data at a rate significantly divergent from the normal pattern can be indicative of a fault. Similarly, an anomalous shift in the user's operational conduct, such as an abrupt surge or decline in the frequency of accelerator pedal utilization, can also indicate that a system within the vehicle is not functioning optimally.

In the processing (S4), if the preliminary diagnosis result indicates a fault in the vehicle, a digital twin diagnosis of the vehicle fault can be performed. In some embodiments, the processing (S4) can further comprise: (S41) determining a real-time vehicle digital twin model M2, which corresponds to an occurrence time T of the fault and indicates an actual state of the vehicle; and (S42) determining a location and a fault level of a faulty component based on the initial vehicle digital twin model M1, the occurrence time T of the fault and the real-time vehicle digital twin model M2.

The initial digital twin model of the vehicle can be utilized as a point of reference representing an optimal state of the vehicle devoid of any faults. The initial digital twin model can be constructed based on the vehicle design and factory parameters. A comparison of the initial digital twin model M1 of the vehicle and the real-time digital twin model M2 of the vehicle at the time of fault T can allow for an identification of discrepancies and inconsistencies between the two models. Such discrepancies can indicate a precise location of the fault, such as a sensor having anomalous reading or a mechanical component exhibiting a degraded performance. Moreover, a severity of these discrepancies can be evaluated to determine a level of the fault.

In some embodiments, the processing (S41) can comprise (S411) retrieving from the first database DB1 the vehicle data that is collected over a predetermined time period preceding the occurrence time T; (S412) entering, in a time stamp sequence, the collected vehicle data retrieved in (S411) as input data into the initial vehicle digital twin model M1 for simulation, thereby generating a sensor simulation data; and (S413) comparing the sensor simulation data with the collected vehicle data to iteratively optimizing the initial vehicle digital twin model M1 so as to obtain the real-time vehicle digital twin model M2.

The discrepancy between the model parameter values of the real-time vehicle digital twin model M2 and the initial vehicle digital twin model M1 can serve to identify the location and the extent of the faulty component.

In the processing S411, the basis for subsequent simulations can be provided by extracting vehicle data from the first database DB1 for a specific time period. In the processing S412, the vehicle data can be used as input into the initial vehicle digital twin model M1 in a time-stamped order. The key to this processing can lie in utilizing the model for high-precision simulation, hereby generating a sensor simulation data. In the processing S413, the generated sensor simulation data can be compared with the actual collected vehicle data. This comparison process can be iterative, whereby the initial vehicle digital twin model M1 can be optimized continuously through comparison and adjustment, thereby more accurately reflecting the actual operation of the vehicle. Accordingly, the real-time vehicle digital twin model M2 can be generated. The updated model can comprise various updates to the initial vehicle digital twin model M1, thereby facilitating a more accurate real-time simulation of the vehicle's status.

In some embodiments, the processing S412 for generating a sensor simulation data can comprise:

(S4121) defining a state transfer equation of formula (I) to generate a current sensor estimate from a prior vehicle data:

$$x(t|t-1) = f(y(t-1),\ u(t-1),\ s(t-1)) \tag{I}$$

where x(t|t−1) being the sensor estimate at time t generated from the vehicle data at time t−1, y(t−1) being the vehicle sensor data at time t−1, u(t−1) being the user operating behavior data at time t−1, s(t−1) being the vehicle environment data at time t−1, and f(•) being an association characteristic equation; and (S4122) defining an update equation of formula (II):

$$x(t) = x(t|t-1) + x'(t-1) * Ts \tag{II}$$

where x(t) being the sensor simulation data at time t, x(t|t−1) being the sensor estimate at time t generated from the vehicle data at time t−1, x'(t−1) being a derivative of the sensor simulation data at time t−1, and Ts being the time step.

The processing S412 can provide a methodology for generating the current sensor estimate through the analysis of historical vehicle data. The processing can involve the application of two equations: a state transfer equation (I) and an update equation (II). The state transfer equation (I) can employ the vehicle the sensor data, the user operating behavior data and the vehicle environment data from the previous moment to predict the sensor data of the current moment. The state transfer equation (I) can be capable of reflecting the dynamic nature of the system described in this disclosure and of generating new estimates based on the changing input data. The update equation (II) can be based on the state transfer equation (I) and further correct the sensor estimates by incorporating the time step and the derivative of the sensor data to obtain the sensor simulation data. The update equation (II) considers the continuity of time and the change trend of the data, thereby enhancing the accuracy of the estimation. It should be noted that different vehicles may have different sensor configurations and user operation habit. The approach outlined in this disclosure can accommodate these differences by adjusting the association characteristic equation f(•). Furthermore, the selection of the time step Ts can allows for flexibility in the approach. An appropriate Ts value can be determined based on a frequency of sensor data collection and the desired level of prediction accuracy. In some instances, the time step Ts can be smaller than the interval during which vehicle data is collected.

In some embodiments, the processing S413 for obtaining the real-time vehicle digital twin model M2 can comprise:

(S4131) defining an objective function for iterative optimization of formula (III):

$$\min\{|y(t) - x(t)|\} \tag{III}$$

where y(t) being the vehicle data collected at time t; and (S4132) determining, using the objective function for iterative optimization, the real-time vehicle digital twin model M2.

The objective function, as defined in the processing S4131, can be formulated as an iterative optimization problem. The objective is to find a solution that minimizes the absolute difference between y(t), which represents the actual vehicle data collected at time t, and x(t), which represents the model's prediction of the vehicle state. This discrepancy can be interpreted as a discrepancy between the actual data and the model's prediction, and the objective of the optimization process is to minimize this discrepancy to the greatest extent possible. In practice, the optimization process can comprise the application of gradient descent, genetic algorithms, or other iterative methods to gradually adjust the model parameters until a solution with the minimum error is identified.

By employing an iterative optimization process to refine the objective function, we can construct a highly accurate real-time digital twin model M2 of the vehicle. The real-time digital twin model M2 can be capable of substantially and dynamically reproducing the real-time fault situation of the current vehicle. In other words, the real-time digital twin model M2 can be a digital twin model of the current vehicle fault. The dynamic nature of the model M2 can allow it to adapt to changing operating conditions and environmental factors, thereby facilitating a more accurate fault detection. For example, by adjusting its model parameters, the real-time digital twin model M2 can simulate a clogged air filter, or a gap between a cylinder and a piston at a value exceeding a specified threshold, or a coolant amount below a defined threshold. Furthermore, the real-time digital twin model M2 can simulate multiple vehicle faults simultaneously. Therefore, the real-time digital twin model M2 can exhibit a comparable model structure to that of the initial digital twin model M1 of the vehicle, yet differ in terms of the values assigned to the model parameters. The different model parameter values can be used to assist in determining the location of the faulty component and an extent of the fault.

In some embodiments, the processing S42 for determining a location and a fault level of a faulty component can comprise: determining a general fault in one or more components if a difference in absolute model parameter values of the one or more components in the initial vehicle digital twin model M1 and the real-time vehicle digital twin model M2 exceeds a first empirical threshold; determining a moderate fault in one or more components if a difference in absolute values of parameters of the one or more components in the initial vehicle digital twin model M1 and the real-time vehicle digital twin model M2 exceeds a second empirical threshold; and determining a severe fault in one or more components if a difference in absolute values of parameters of the one or more components in the initial vehicle digital twin model M1 and the real-time vehicle digital twin model M2 exceeds a third empirical threshold. In an example, the third empirical threshold can be greater than the second empirical threshold, and the second empirical threshold can be greater than the first empirical threshold.

In some embodiments, the processing S5 for generating a visual representation of the fault can comprise retrieving from the second database DB2 the vehicle data at the occurrence time T of the fault, displaying the real-time vehicle digital twin model M2, and highlighting a model component in the real-time vehicle digital twin model M2 that corresponds to the faulty component. By extracting the vehicle data at a specific time T from the second database DB2, the fault diagnosis system of the disclosure can rapidly identify the faulty component and visualize and display it in the digital twin model M2. This visual representation not only depicts the location of the faulty component, but also displays other vehicle system information pertinent to the fault, thereby providing the repair personnel with a comprehensive context of the fault.

By employing the three.js rendering tool, the vehicle's digital twin model M2 can be displayed in three-dimensional format in a web browser. This can provide the user with an intuitive and interactive troubleshooting interface. Three.js is a JavaScript library based on WebGL that is capable of rendering complex three-dimensional graphics in the majority of contemporary web browsers, obviating the necessity for specialized plug-ins. The use of three.js in the presentation of the digital twin model not only enhances the model's visual appeal for the user but also facilitates a seamless interactive experience.

The rendering of three-dimensional models is a computationally intensive task, which may place a significant burden on computer resources. To address this issue, a multi-level presentation approach can be employed. In this approach, the digital twin model M2 of the vehicle can be initially displayed with only the most critical features and components, thus reducing the computational burden. This not only reduces the computational resources required for the initial rendering, but also accelerates the loading of the model, thereby enabling the user to interact with the model without delay. The system only loads and displays higher-resolution model parts when the user requires more detailed information. This approach of gradual refinement not only enhances the system's responsiveness but also optimizes the user experience. Furthermore, this multi-level presentation approach facilitates the protection of sensitive data. In the initial display phase, the potential for data leakage is mitigated by limiting the visibility of superfluous details that are not pertinent to repair operations. Only upon explicit user action, such as clicking or touching, will the system provide additional details. This approach is designed to ensure the security of the information while simultaneously satisfying the user's need for information.

Another aspect of the disclosure provides a system for diagnosing vehicle faults using a digital twin. In some embodiments, the system can comprise an initial vehicle digital twin model M1, a vehicle data collection unit, a first database DB1 and a second database DB2, a vehicle fault preliminary diagnosis unit, a vehicle fault digital twin diagnosis unit, and a visual presentation unit. In some embodiments, the vehicle data collection unit can be configured to collect a vehicle data of a vehicle. The vehicle data can comprise a vehicle sensor data, a user operating behavior data and a vehicle environment data. The first database DB1 and the second database DB2 can each be configured to store the collected vehicle data in association with respective generation time stamp and sensor identification codes. The vehicle fault preliminary diagnosis unit can be configured to perform a preliminary diagnosis of whether the vehicle has a fault based on the collected vehicle sensor data to obtain a preliminary diagnosis result. The vehicle fault digital twin diagnosis unit can be configured to perform a digital twin diagnosis of a vehicle fault if the preliminary diagnosis result indicates that the vehicle has a fault. The digital twin diagnosis of the vehicle fault can comprise (S41) determining a real-time vehicle digital twin model M2, the real-time vehicle digital twin model M2 corresponding to an occurrence time T of the fault and indicating an actual state of the vehicle; and (S42) determining a location and a fault level of a faulty component based on the initial vehicle digital twin model M1, the occurrence time T of the fault and the real-time vehicle digital twin model M2. The visual presentation unit can be configured to generate a visual representation of the fault.

In some embodiments, the first database DB1 can be configured to store the collected vehicle data using the generation time stamp as a primary key and the sensor identification code as a secondary key. The second database DB2 can be configured to store the collected vehicle data using the sensor identification code as a primary key and the generation time stamp as a secondary key.

In some embodiments, the processing S41 of the vehicle fault digital twin diagnosis unit can comprise: (S411) retrieving from the first database DB1 the vehicle data that is collected over a predetermined time period preceding the occurrence time T; (S412) entering, in a time stamp sequence, the collected vehicle data retrieved in (S411) as input data into the initial vehicle digital twin model M1 for simulation, thereby generating a sensor simulation data; and (S413) comparing the sensor simulation data with the collected vehicle data to iteratively optimizing the initial vehicle digital twin model M1 so as to obtain the real-time vehicle digital twin model M2.

A difference between model parameter values of the real-time vehicle digital twin model M2 and the initial vehicle digital twin model M1 can be indicative of the location and fault level of the faulty component.

In some embodiments, the processing (S412) can comprise:

(S4121) defining a state transfer equation of formula (I) to generate a current sensor estimate from a prior vehicle data:

$$x(t|t-1) = f(y(t-1),\ u(t-1),\ s(t-1)) \tag{I}$$

where $x(t|t-1)$ being the sensor estimate at time t generated from the vehicle data at time t−1, $y(t-1)$ being the vehicle sensor data at time t−1, $u(t-1)$ being the user operating behavior data at time t−1, $s(t-1)$ being the vehicle environment data at time t−1, and $f(\cdot)$ being an association characteristic equation; and (S4122) defining an update equation of formula (II):

$$x(t) = x(t|t-1) + x'(t-1) * Ts \tag{II}$$

where $x(t)$ being the sensor simulation data at time t, $x(t|t-1)$ being the sensor estimate at time t generated from the vehicle data at time t−1, x'(t−1) being a derivative of the sensor simulation data at time t−1, and Ts being the time step.

Ts can be smaller than an interval during which vehicle data is collected.

In some embodiments, the processing (S413) can comprise:

(S4131) defining an objective function for iterative optimization of formula (III):

$$\min\{|y(t)-x(t)|\} \tag{III}$$

where y(t) being the vehicle data collected at time t; and (S4132) determining, using the objective function for iterative optimization, the real-time vehicle digital twin model M2.

In some embodiments, the processing S42 of the vehicle fault digital twin diagnosis unit can comprise: determining a general fault in one or more components if a difference in absolute model parameter values of the one or more components in the initial vehicle digital twin model M1 and the real-time vehicle digital twin model M2 exceeds a first empirical threshold; determining a moderate fault in one or more components if a difference in absolute values of parameters of the one or more components in the initial vehicle digital twin model M1 and the real-time vehicle digital twin model M2 exceeds a second empirical threshold; and determining a severe fault in one or more components if a difference in absolute values of parameters of the one or more components in the initial vehicle digital twin model M1 and the real-time vehicle digital twin model M2 exceeds a third empirical threshold. The third empirical threshold can be greater than the second empirical threshold. The second empirical threshold can be greater than the first empirical threshold.

In some embodiments, the visual presentation unit can be configured to retrieve from the second database DB2 the vehicle data at the occurrence time T of the fault, display the real-time vehicle digital twin model M2, and highlight a model component in the real-time vehicle digital twin model M2 that corresponds to the faulty component. In some embodiments, the visual presentation unit can be configured to display detailed model information of a component when a terminal user clicks or touches the component in the real-time vehicle digital twin model M2.

The disclosure also provides a system including one or more computer processors and a computer readable memory. The computer readable memory can comprise machine executable code, which implements the digital twin-based method for diagnosing vehicle faults of the disclosure when executed by the one or more computer processors.

In comparison to conventional diagnostic techniques, the real-time digital twin model-based approach for diagnosing vehicle faults of the disclosure can facilitate a more efficient, accurate and comprehensive fault detection. Conventional vehicle diagnostic methods typically rely on physical inspection and the driver's intuitive judgment, which can be time-consuming and labor-intensive. Furthermore, these methods are inadequate in the face of complex or hidden faults. In contrast, the real-time digital twin model-based method for diagnosing vehicle faults of the disclosure employs real-time data and sophisticated algorithms to accurately reproduce and simulate the real-time status of the vehicle, including various potential fault conditions, in a virtual environment.

By continuously collecting the vehicle's operational data and comparing it with the pre-set model parameters, the digital twin model M2 of the disclosure is able to monitor the vehicle status in real time and detect faults in a timely manner. This approach not only enhances the efficiency of fault detection but also minimizes the potential for human errors in the diagnostic process, largely due to its high degree of automation and accuracy. Moreover, the digital twin model M2 is capable of simulating a variety of different fault scenarios, which is challenging to accomplish with conventional techniques. For example, the digital twin model M2 is capable of concurrently simulating both a clogged air filter and a coolant deficiency, which is beneficial for elucidating the interrelationship between diverse faults and their influence on the vehicle's overall performance.

Additionally, the digital twin model M2 is capable of forecasting potential future failures in a manner that is not achievable through conventional diagnostic techniques. By examining long-term data trends and patterns, the digital twin model is capable of predicting which components are likely to fail in the future. This allows repair teams to take appropriate action in advance to prevent such failures. This strategy of preventive repair not only extends the service life of the vehicle but also reduces unexpected downtime and improves vehicle reliability and safety. In the domain of autonomous driving and intelligent vehicles, the benefits of the digital twin model M2 are particularly evident. The digital twin model M2 is capable of interacting with the vehicle's control system in real time, providing immediate feedback and adjustment recommendations to enhance the vehicle's performance and driving strategy. Such real-time data analysis and decision support is not feasible within the context of traditional diagnostic methods. The implementation of the digital twin model M2 facilitates the repair of optimal vehicle condition in complex environments, thereby ensuring driving safety.

While preferred embodiments of the present invention have been shown and described herein, it will be obvious to those skilled in the art that such embodiments are provided by way of example only. Numerous variations, changes, and substitutions will occur to those skilled in the art without departing from the invention.

What is claimed is:

1. A method for diagnosing vehicle faults using a digital twin, the method comprising:

(S1) collecting, by one or more processors, a vehicle data from a vehicle, the vehicle data comprising a vehicle sensor data, a user operating behavior data and a vehicle environment data, wherein an initial vehicle digital twin model M1 is stored in a memory accessible to the one or more processors;

(S2) storing, by the one or more processors, the collected vehicle data in association with respective generation time stamp and sensor identification codes in a first database DB1 and a second database DB2, wherein the collected vehicle data are stored in the first database DB1 using the generation time stamp as a primary key and the sensor identification code as a secondary key, and are stored in the second database DB2 using the sensor identification code as a primary key and the generation time stamp as a secondary key;

(S3) performing, by the one or more processors, a preliminary diagnosis of whether the vehicle has a fault based on the collected vehicle sensor data to obtain a preliminary diagnosis result;

(S4) performing, by the one or more processors, a digital twin diagnosis of a vehicle fault when the preliminary diagnosis result indicates that the vehicle has a fault; and (S5) generating, by the one or more processors, a visual representation of the fault, wherein the processing (S4) comprises:

(S41) retrieving, from the first database DB1, the vehicle data that is collected over a predetermined time period preceding an occurrence time T of the fault;

(S42) entering, in a time stamp sequence, the collected vehicle data retrieved in (S41) as input data into the initial vehicle digital twin model M1 for simulation, thereby generating a sensor simulation data;

(S43) comparing the sensor simulation data with the collected vehicle data to iteratively optimizing the initial vehicle digital twin model M1 so as to obtain the real-time vehicle digital twin model M2; and (S44) determining a location and a fault level of a faulty component based on a difference between model parameter values of the real-time vehicle digital twin model M2 and the initial vehicle digital twin model M1, wherein the processing (S5) comprises: retrieving, from the second database DB2, the vehicle data at the occurrence time T of the fault, displaying the real-time vehicle digital twin model M2, and highlighting a model component in the real-time vehicle digital twin model M2 that corresponds to the faulty component as the visual representation of the fault.

2. The method of claim 1, wherein the processing (S42) comprises:

(S421) defining a state transfer equation of formula (I) to generate a current sensor estimate from a prior vehicle data:

$$x(t|t-1)=f(y(t-1),\ u(t-1),\ s(t-1)) \tag{I}$$

wherein x (t|t−1) is the sensor estimate at time t generated from the vehicle data at time t−1, y(t−1) is the vehicle sensor data at time t−1, u(t−1) is the user operating behavior data at time t−1, s(t−1) is the vehicle environment data at time t−1, and f(•) is an association characteristic equation; and (S422) defining an update equation of formula (II):

$$x(t)=x(t|t-1)+x'(t-1)*Ts \tag{II}$$

wherein x(t) is the sensor simulation data at time t, x(t|t−1) is the sensor estimate at time t generated from the vehicle data at time t−1, x'(t−1) is a derivative of the sensor simulation data at time t−1, and Ts is the time step, Ts being smaller than an interval during which vehicle data is collected;

wherein the processing (S43) comprises:

(S431) defining an objective function for iterative optimization of formula (III):

$$\min\{|y(t)-x(t)|\} \tag{III}$$

wherein y(t) is the vehicle data collected at time t; and (S432) determining, using the objective function for iterative optimization, the real-time vehicle digital twin model M2.

3. The method of claim 1, wherein the processing (S44) comprises:

determining a general fault in one or more components if a difference in absolute model parameter values of the one or more components in the initial vehicle digital twin model M1 and the real-time vehicle digital twin model M2 exceeds a first empirical threshold;

determining a moderate fault in one or more components if a difference in absolute values of parameters of the one or more components in the initial vehicle digital twin model M1 and the real-time vehicle digital twin model M2 exceeds a second empirical threshold; and determining a severe fault in one or more components if a difference in absolute values of parameters of the one or more components in the initial vehicle digital twin model M1 and the real-time vehicle digital twin model M2 exceeds a third empirical threshold, wherein the third empirical threshold is greater than the second empirical threshold, and the second empirical threshold is greater than the first empirical threshold.

4. The method of claim 1, wherein the processing (S5) further comprises:

displaying detailed model information of a component when a terminal user clicks or touches the component in the real-time vehicle digital twin model M2.

5. A system comprising one or more computer processors and a computer-readable memory, wherein the computer readable memory comprising machine executable code that, upon execution by the one or more computer processors, causes the one or more processors to perform operations comprising:

(S1) collecting, by the one or more processors, a vehicle data from a vehicle, the vehicle data comprising a vehicle sensor data, a user operating behavior data and a vehicle environment data, wherein an initial vehicle digital twin model M1 is stored in the memory accessible to the one or more processors;

(S2) storing, by the one or more processors, the collected vehicle data in association with respective generation time stamp and sensor identification codes in a first database DB1 and a second database DB2, wherein the collected vehicle data are stored in the first database DB1 using the generation time stamp as a primary key and the sensor identification code as a secondary key, and are stored in the second database DB2 using the sensor identification code as a primary key and the generation time stamp as a secondary key;

(S3) performing, by the one or more processors, a preliminary diagnosis of whether the vehicle has a fault based on the collected vehicle sensor data to obtain a preliminary diagnosis result;

(S4) performing, by the one or more processors, a digital twin diagnosis of a vehicle fault when the preliminary diagnosis result indicates that the vehicle has a fault; and (S5) generating, by the one or more processors, a visual representation of the fault, wherein the processing (S4) comprises:

(S41) retrieving, from the first database DB1, the vehicle data that is collected over a predetermined time period preceding an occurrence time T of the fault;

(S42) entering, in a time stamp sequence, the collected vehicle data retrieved in (S41) as input data into the initial vehicle digital twin model M1 for simulation, thereby generating a sensor simulation data; and (S43) comparing the sensor simulation data with the collected vehicle data to iteratively optimizing the initial vehicle digital twin model M1 so as to obtain the real-time vehicle digital twin model M2; and (S44) determining a location and a fault level of a faulty component based on a difference between model parameter values of the real-time vehicle digital twin model M2 and the initial vehicle digital twin model M1, wherein the processing (S5) comprises: retrieving, from the second database DB2, the vehicle data at the occurrence time T of the fault, displaying the real-time vehicle digital twin model M2, and highlighting a model component in the real-time vehicle digital twin model M2 that corresponds to the faulty component as the visual representation of the fault.

* * * * *